United States Patent Office 3,573,182
Patented Mar. 30, 1971

3,573,182
PROCESS FOR SEPARATING ZINC AND COPPER
Philip E. Churchward and Samuel Ralph Borrowman, Salt Lake City, Utah, assignors to the United States of America as represented by the Secretary of the Interior
Filed Jan. 11, 1968, Ser. No. 697,213
Int. Cl. C22d 1/22; C22b 15/12
U.S. Cl. 204—119                                                     6 Claims

ABSTRACT OF THE DISCLOSURE

Zinc is preferentially extracted from solutions containing copper and zinc ions using a calcium salt of an organic hydrogen phosphate. A complete process including the selective extraction and the recovery of zinc and copper from the organic and aqueous phases respectively is described.

---

This invention resulted from work done by the Bureau of Mines of the Department of the Interior, and the domestic title to the invention is in the Government.

BACKGROUND OF THE INVENTION

Field of invention

This invention relates to the field of zinc and copper recovery from solutions. More particularly the invention relates to a novel method of selectively separating zinc and copper by solvent extraction and recovering the metals once separated.

Description of prior art

A number of known procedures are available for effecting a separation of copper and zinc from ores containing both. As will be appreciated from a consideration of these prior techniques the present method of separation and recovery using a selective extraction is an improvement over the art by virtue of its simplicity and practicality.

Copper and zinc occur in intimate association in many ores. These may be oxidized ores, from which the only feasible method of metal recovery is by hydrometallurgical process in which the first step is leaching with sulfuric acid to obtain the metal values as a solution of copper and zinc sulfates, or they may be sulfide ores. The sulfide ores may be concentrated by flotation. From some ores by differential flotation, a zinc concentrate containing most of the zinc and a little copper and a copper concentrate containing a little zinc may be obtained. From other ores such a separation may be accomplished only with low recovery of metals values, or it may not be possible at all, although a bulk concentrate containing both the copper and zinc may be entirely feasible. In any case, the separation is imperfect. The economic value of the copper in zinc concentrates sent to a zinc smelter or of zinc in the concentrates sent to a copper smelter is lost.

An alternative procedure for separating and recovering copper and zinc using known methods is to solubilize the copper and zinc in the ore or concentrates either by roasting and leaching the roast with sulfuric acid, or by leaching in an autoclave under pressure. Either method results in a solution containing zinc and copper sulfates. The copper can be recovered from this solution by a conventional electrodeposition of copper. In order to recover the zinc by electrowinning, however, all the copper must first be removed from solution. This can be done by a series of steps. Part of the copper can be removed by electrolysis as pure metal. The solution from this step can be further depleted in copper by a second electrolysis step which gives a less pure copper deposit at low current efficiency, and the final traces of copper removed by cementation on zinc dust. Conversely, this invention provides a simpler and more economical procedure in which zinc is removed from the copper solution and at the same time concentrated to give an enrich zinc sulfate solution while leaving a copper solution suitable for electrowinning of copper.

Copper and zinc have been shown to be capable of extraction from their ores by use of an organic hydrogen phosphate extraction. This method is taught in U.S. Patent 2,992,894 to Hazen et al. The method involves the extraction of divalent cations of copper and zinc from acid solutions of their ores using a water-immiscible organic solvent comprising an organic hydrogen phosphate such as di-2-ethylhexyl phosphoric acid dissolved in an inert solvent such as kerosine. Designating the 2-ethylhexyl phosphate radical by the symbol EHP, the reactions involved may be expressed by the following equations:

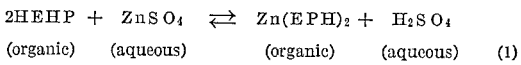

$$2HEHP + ZnSO_4 \rightleftarrows Zn(EHP)_2 + H_2SO_4$$
(organic)   (aqueous)        (organic)      (aqueous)         (1)

and,

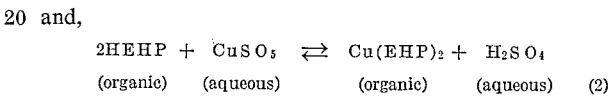

$$2HEHP + CuSO_4 \rightleftarrows Cu(EHP)_2 + H_2SO_4$$
(organic)   (aqueous)        (organic)      (aqueous)         (2)

While this method may be used to extract zinc from zinc solutions, copper from copper solutions and both zinc and copper from solutions containing a mixture of zinc and copper ions, it has two main drawbacks which limit its utility.

First, it is well know that the pH of this extraction is critical, and since, as shown by the above reaction, hydrogen ion is continually transferred to the aqueous phase, the pH of the aqueous solution is continually lowered. If the process is allowed to proceed in an effort to recover substantial amounts of copper or zinc from the aqueous phase, that phase acquires such a low pH that the extraction becomes very inefficient. The second limitation of the Hazen et al. process is that it accomplishes a simultaneous extraction of copper and zinc rather than a selective extraction which would allow for their separation from solutions containing both cations. It will readily be appreciated that a process which is capable of both separation and recovery of copper and zinc will greatly enhance the utility of the type of extraction method taught by Hazen et al.

SUMMARY

Briefly, and in a general sense this invention involves the selective extraction of zinc from solutions containing both zinc and copper ions.

DETAILED DESCRIPTION OF THE PREFERRED EMBODIMENTS

In accordance with the present invention it has been discovered that the divalent cations of zinc and copper can be concentrated and removed from aqueous solutions by a solvent extraction process wherein the extractant used comprises a solution of a calcium salt of an organic hydrogen phosphate. Though the preferred extractant is a solution of the calcium salt of di-2-ethylhexyl phosphoric acid, calcium salts of the various organic hydrogen phosphate compounds described in U.S. Patent 2,992,894 may be used.

When the calcium salt of di-2-ethylhexyl phosphoric acid $Ca(EHP)_2$ is contacted with an aqueous solution of zinc or copper ions, as for example a sulfate solution resulting from a sulfuric acid leach, of copper and zinc ores or concentrates the following reactions occur:

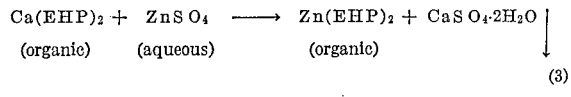

and,

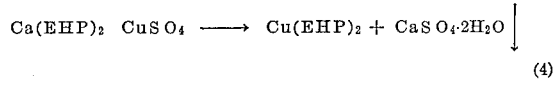

By using a calcium salt form of extractant, pH control is greatly simplified because no hydrogen ion is transferred to the aqueous phase during extraction.

It is necessary merely to adjust the pH of the aqueous solution fed to the extraction apparatus so that the pH of the effluent phase is in the general range of from about 2.5 to 4.0 and preferably in the range of 3.0 to 4.0 for most extractions. In this pH range the calcium salt extractants are capable of removing both zinc and copper from aqueous solutions. However, we have found that zinc is preferentially extracted as shown in the following reaction:

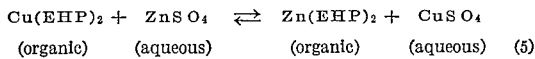

This selectability of the extracting agents of the present invention allows for the first time a separation of zinc from copper using a solvent extraction process.

The calcium salt extractants used may be prepared by contacting a solution of an organic phosphoric acid in an inert diluent, such as kerosine, with a milk of lime suspension. For example, in the case of the calcium salt of ethylhexylphosphoric acid, the reaction is as follows:

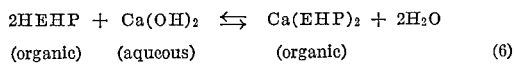

When the organic extractant is contacted with an aqueous solution containing zinc or copper ions, the metal extracted into the organic phase may be transferred and concentrated into an aqueous phase by contacting the loaded organic phase with an acid, as described in the Hazen et al. patent. The organic extractant is then in the acid form and can be regenerated to the calcium form for reuse by contact with a milk of lime suspension.

Figure 1:
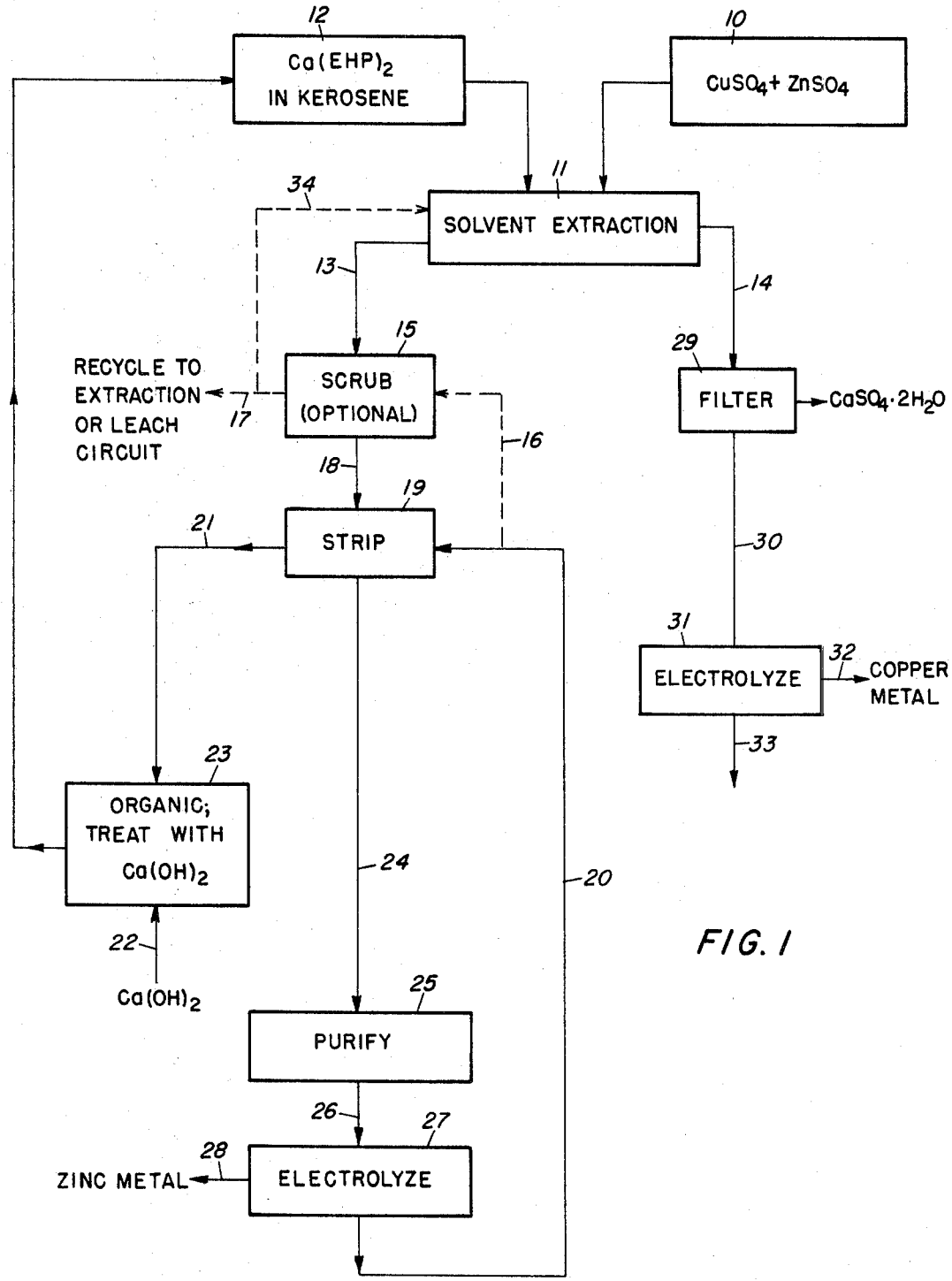
FIG. 1 represents a schematic diagram of a flowplan for a process of separating and recovering zinc and copper from a solution containing both zinc and copper ions.

A selective extraction from a solution containing zinc and copper ions is shown in FIG. 1. In that figure, a solution 10 containing zinc sulfate and copper sulfate, as for example, a solution formed by leaching with sulfuric acid an ore or concentrate containing acid soluble zinc and copper compounds or by autoclave leaching or sulfide ores, is fed to solvent extraction zone 11. The apparatus used in zone 11 may be any equipment commonly used for solvent extraction, such as mixer-settlers. Also fed to extraction zone 11 is a solution of a calcium salt of an organic hydrogen phosphate in an inert diluent. In FIG. 1, extractant shown as 12 is a solution of the calcium salt of di-2-ethylhexyl phosphoric acid in kerosine. The concentration of organic phosphate may range from 1 to 30 percent by volume. Contact between aqueous solution 10 and organic solution 12 in zone 11 is preferably countercurrent using plural stages. Satisfactory results have been obtained by using 3 contact stages.

The pH of aqueous effluent 14 after extraction is in the general range of from 2.5 to 4.0 but preferably from 3.5 to 4.0 for most efficient operation. Control of this pH range is important. If the pH is too low, extraction is inefficient and if it is too high, phase separation is poor as copper is then coprecipitated with the calcium sulfate and organic extractant becomes entrained within the calcium sulfate (gypsum) particles. However, if the pH is held within the ranges stated above, phase separation is good, the calcium sulfate separates as fine white crystals and very little organic extractant is lost by entrainment. Along with pH control, the relative flow rates of aqueous solution 10 and organic solution 12 should be controlled if selective extraction of zinc is to be obtained. The actual ratio will of course vary as different concentrations of organic and aqueous solutions are used. A 20 volume percent organic feed has an extraction capacity of about 18 grams of zinc per liter. However, with any particular combination of organic and aqueous feeds it will not be difficult to arrive at the proper optimum operating conditions.

As shown in FIG. 1, the organic effluent 13 from extraction 11 is first sent to a scrubbing zone 15 if it is desired to further reduce the amount of any copper which was extracted with the zinc in zone 11. This step of the process is of course optional and need not be an essential part of the overall separation and recovery operation. When it is incorporated into the system, effluent 13 is scrubbed with a small amount of acid 16. The aqueous scrub solution 17 produced in scrub zone 15 may either be recycled via 34 to extraction zone 11 or added to the concentrated zone leach liquors as will be further explained. The scrubbed organic solution 18 from zone 15 is then passed to a stripping zone 19 wherein it is contacted with an aqueous acid solution 20. As a result of this contact, the zinc content of stream 18 is transferred to the aqueous phase. The zinc depleted organic effluent 21 from stripping zone 19 is treated with a milk of lime solution 22 in zone 23 to reconvert the organic hydrogen phosphate back to the calcium form 12 for further use in extraction zone 11. Effluent 24 from stripping zone 19 comprises concentrated aqueous zinc solution This solution is passed to a purification zone 25 where copper and other trace impurities are removed by a conventional contact with zinc dust. The resulting purified solution 26 is then amenable to zinc removal and recovery by a conventional electrowinning treatment represented by 27 in FIG 1. The products of such a treatment are zinc metal 28 and an acid electrolyte 20. The latter is recycled as the acid feed to stripping zone 19 and, a portion 16 of the spent electrolyte may be fed to the optional scrubbing zone 15.

Returning now to the extraction zone 11, the copper bearing aqueous effluent 14 is first filtered in zone 29 to remove precipitated calcium sulfate. Provisions may be made for separation and withdrawal of calcium sulfate (gypsum) in extraction zone 11. However, it has been found that in multiple stage extraction this was necessary only in the stage where fresh organic extractant entered the system. If the filtered copper solution 30 is high in copper content, which will be the normal case, it is fed to a conventional copper electrowinning system 31 where copper metal 32 and a spent acid electrolyte 33 are formed. The latter may be used to leach ore or roasted concentrates to form additional feed solution 10. If solution 14 is low in copper concentration, it is extrated with another portion of the same solution used to extract zinc and is then recovered by sulfuric acid stripping and electrowinning. Example 3 and corresponding FIG. 3 referred to below further illustrate the extraction and stripping of copper after a preliminary extraction of zinc, as from extraction zone 11 and filter zone 29 in FIG. 1.

A number of modifications and additions are possible in the operation of this process. For example, as previously mentioned a variety of organic hydrogen phosphates may be converted to their calcium salts for use in the invention. Diluents other than kerosine such as hexane, toluene, benzene, naphthas and the like may be used. Also, agents such as isodecyl alcohol and tributyl phosphate may be added to the organic extractant to aid in phase separation. Still further, a wide variety of equipment designs may be used to carry out the various steps of the process.

The following examples further illustrate the process:

Example 1.—A solvent extraction system was assembled according to the scheme shown in FIG. 1. A leach solution containing 50 grams Cu per liter and 14.8 grams Zn per liter was prepared by leaching a roasted copper concentrate. The pH of this solution was adjusted to about 3 to precipitate the bulk of the dissolved iron. An organic extractant was prepared from a kerosine solution containing 20 percent by volume di-2-ethylhexyl phosphoric acid and 10 percent isodecyl alcohol by contacting with milk of lime to produce the calcium salt. The zinc was extracted countercurrently in three stages. The loaded organic was scrubbed with a small amount of dilute acid and the aqueous scrub solution fed to the extractors. The aqueous effluent or raffinate had a pH of 3.7 and contained 99.4 percent of the copper fed to the system and 3.4 percent of the zinc. The loaded organic extractant was stripped in three stages with a solution 2.5 normal in $H_2SO_4$ and containing 25 grams Zn per liter. Ninety-six percent of the zinc was recovered in a solution containing 100 grams Zn per liter and 1.5 grams Cu per liter. The zinc strip solution was purified with zinc powder and electrolyzed to produce zinc metal at over 90 percent current efficiency. The spent electrolyte can be recycled, as it was successfully used for stripping the loaded organic in a second run.

The gypsum formed in the extraction process was filtered, washed, and dried, and contained only 0.01 percent Cu and a negligible amount of other impurities.

Example 2.—A leach liquor containing about 70 grams Cu per liter and 18 grams Zn per liter after iron removal was diluted to contain 54 grams Cu per liter and 14 grams Zn per liter.

Figure 2:
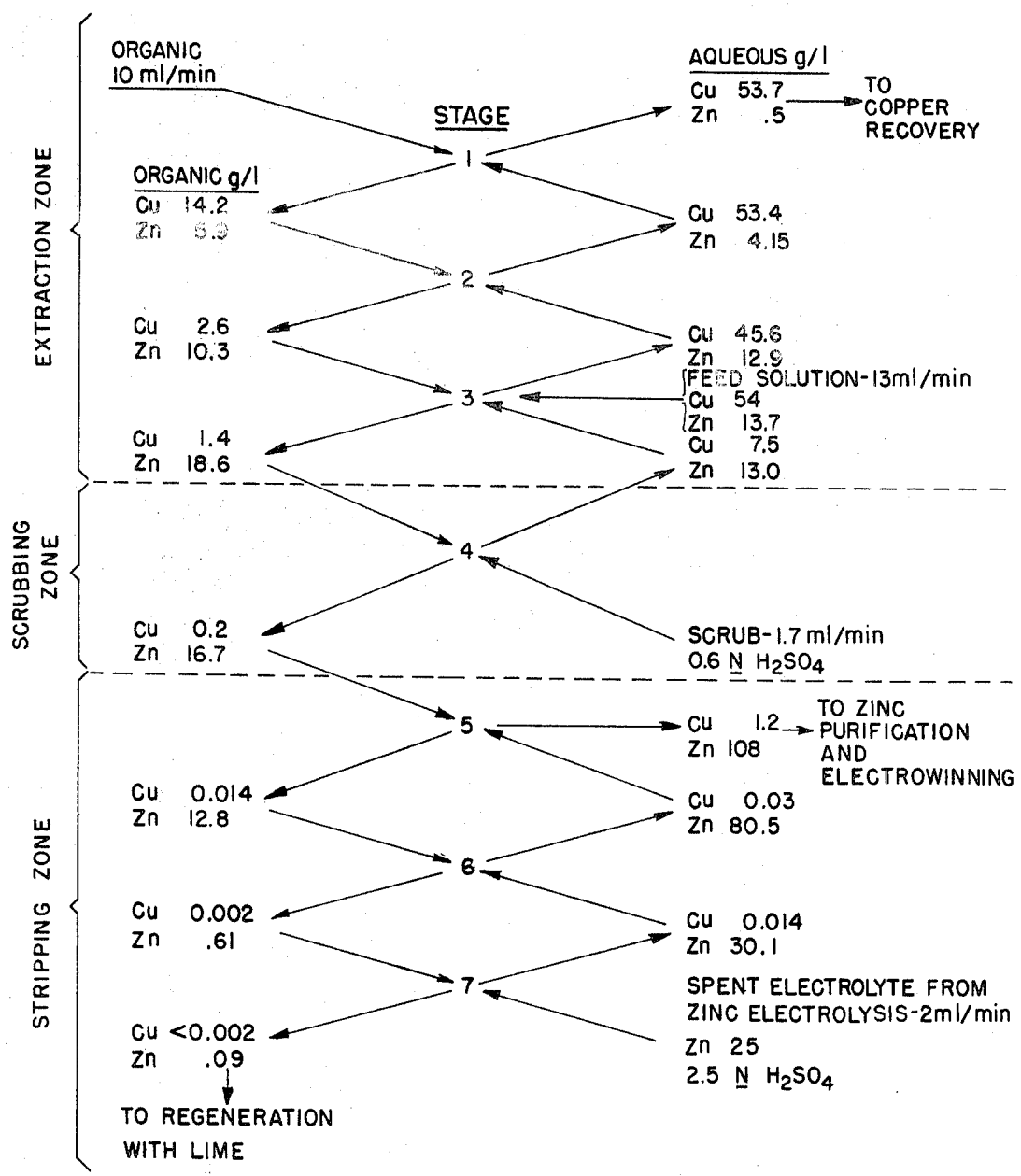
FIG. 2 shows schematically an example of a multi-stage system for extraction of zinc from a solution containing zinc and copper ions.

The extraction system and solution balance are diagrammed in FIG. 2. Zinc was extracted countercurrently in three stages. In stage 1, zinc and a small amount of copper were extracted. In stages 2 and 3 zinc was extracted and copper displaced from the organic by reaction (5). Calcium sulfate (gypsum) precipitates in stage 1 and provision must be made for its continuous removal from the stage 1 settler. No appreciable gypsum is precipitated in stages 2 and 3.

After stage 3 the organic flows to a scrub stage. A small amount of dilute sulfuric acid is fed to this stage, but as the aqueous flow is small in relation to the organic flow, provision must be made for recycling the aqueous phase from the settler to the mixer to keep the aqueous phase in the mixer continuous. The purpose of the scrub stage is to remove droplets of aqueous solution entrained in the organic phase from stage 3 and also to strip small amounts of copper from the organic extractant. Any zinc stripped in this stage is recovered by returning the aqueous scrub solution of stage 3.

The zinc-loaded organic extractant from stage 3 was fed to the stripping circuit (stages 5, 6, and 7) where zinc was stripped into the aqueous phase, countercurrently, by an approximately 1 M $H_2SO_4$ solution containing about 25 grams Zn per liter, which simulates a spent electrolyte from zinc electrowinning. The organic extractant was thereby converted to the acid form, and subsequently regenerated to the calcium salt by contacting with milk of lime, and recycled.

Figure 3:
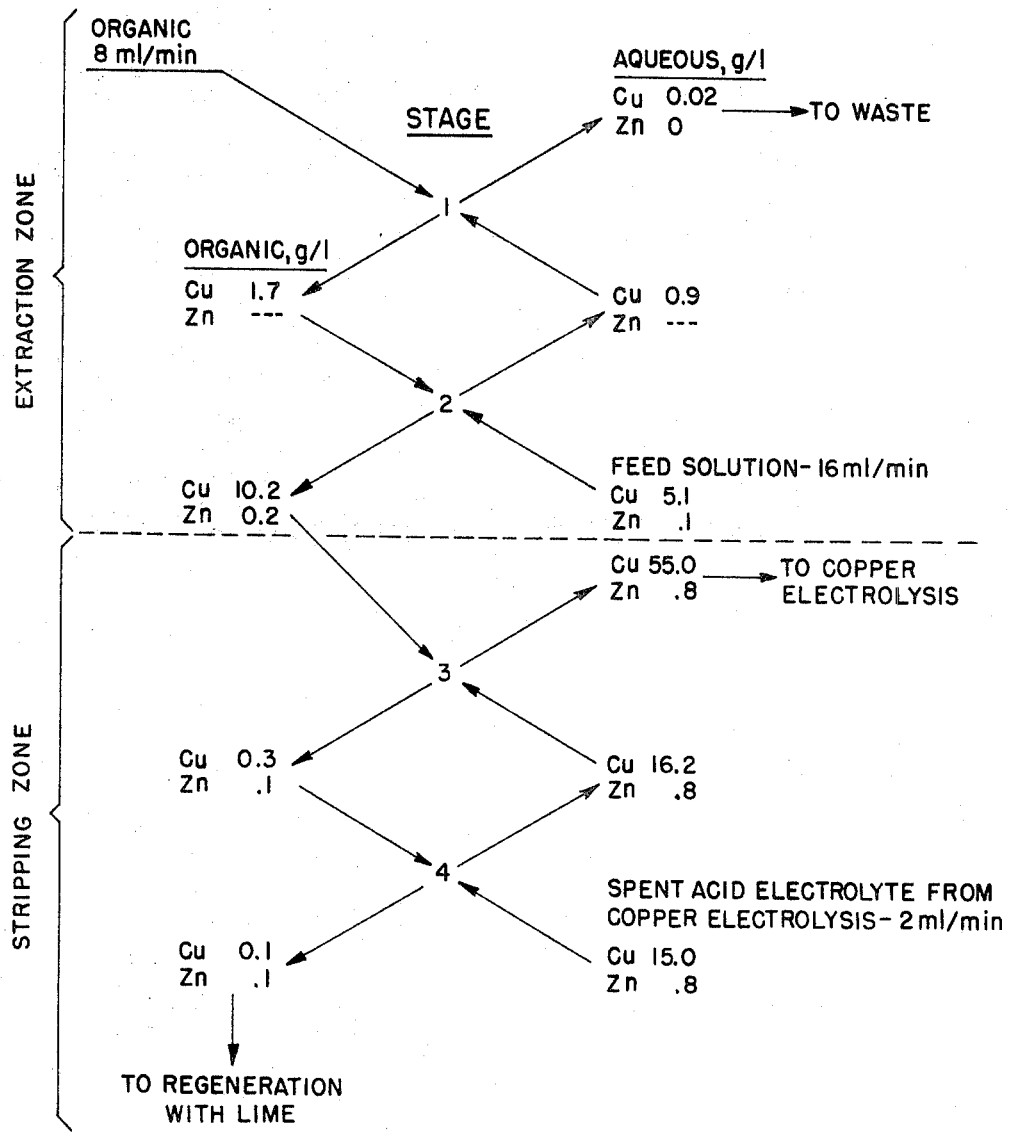
FIG. 3 shows schematically an example of a multi-stage system for extraction of copper from a solution having a major portion of zinc previously extracted.

Example 3.—This example illustrates the extraction and stripping of copper from low concentration solutions. The organic extractant used was the same as used in Example 1, and the acid electrolyte introduced contained 50 g./l. free $H_2SO_4$. The steps of the process and the composition of feed, intermediate and final streams are shown in FIG. 3.

Though the invention has been described with reference to particular preferred embodiments and examples, the scope of the invention should not be restricted thereto but rather is distinctly defined in the claims presented hereinbelow.

What is claimed is:
1. A method for selectively extracting zinc from an aqueous solution containing zinc and copper cations and sulfate anions comprising the steps of:
   (a) contacting said solution with a solution of a calcium salt of an organic hydrogen phosphate in a water insoluble organic diluent whereby said contact results in an organic phase and an aqueous phase and in the transfer of calcium ions to said aqueous phase and transfer of zinc to said organic phase,
   (b) maintaining the pH of said aqueous phase in the range of from 2.5 to 4.0, and
   (c) separating the organic phase from said aqueous phase.

2. The method of claim 1 wherein said calcium salt is the calcium salt of di-2-ethylhexyl phosphoric acid.

3. The method of claim 1 wherein said pH is maintained in the range of 3.0 to 4.0.

4. The method of claim 1 including the further steps of:
   (d) contacting said zinc laden organic phase formed in step (a) with an aqueous acid solution whereby zinc and hydrogen ions are exchanged,
   (e) contacting the organic hydrogen phosphate solution formed in step (d) with a calcium hydroxide suspension to convert the organic hydrogen phosphate to its calcium salt and,
   (f) recycling said calcium salt of said organic hydrogen phosphate to step (a).

5. The method of claim 4 comprising the further step of:
   (g) electrolyzing the aqueous solution containing zinc ions formed in step (d) of claim 4 to produce zinc metal and an aqueous acid electrolyte.

6. The method of claim 5 including the further step of:
   (h) recycling the aqueous acid electrolyte produced in step (g) of claim 5 to supply an aqueous acid solution for use in step (d) of claim 4.

References Cited

UNITED STATES PATENTS

| 3,374,090 | 3/1968 | Fletcher et al. | 75—117 |
| 3,104,971 | 9/1963 | Olson et al. | 75—117 |
| 2,992,894 | 7/1961 | Hazen et al. | 23—147 |

JOHN H. MACK, Primary Examiner

R. L. ANDREWS, Assistant Examiner

U.S. Cl. X.R.

23—147; 75—117